(12) United States Patent
Fikes et al.

(10) Patent No.: US 8,272,557 B1
(45) Date of Patent: Sep. 25, 2012

(54) SHIELD FOR A CUTTING OR WELDING TORCH

(75) Inventors: Jonathan Vincent Fikes, Reno, NV (US); Jack Daniel Douglass, Reno, NV (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 13/294,557

(22) Filed: Nov. 11, 2011

(51) Int. Cl.
*B23K 5/22* (2006.01)
*B23K 37/00* (2006.01)

(52) U.S. Cl. ...................................... 228/59; 219/137.43

(58) Field of Classification Search .......................... None
See application file for complete search history.

(56) References Cited

U.S. PATENT DOCUMENTS

| | | | |
|---|---|---|---|
| 2,093,866 A * | 9/1937 | Sigismund | 261/111 |
| 2,235,594 A | 12/1939 | Smith | |
| 3,430,862 A | 1/1964 | Broderick et al. | |
| D203,082 S | 11/1965 | Whitney | |
| 3,239,648 A * | 3/1966 | Syrigos | 219/137.43 |
| 3,243,571 A * | 3/1966 | Schmerling | 219/137.43 |
| 3,610,349 A * | 10/1971 | Dempsey | 175/209 |
| 4,087,670 A * | 5/1978 | Miller | 219/121.39 |
| 4,267,426 A * | 5/1981 | Mallett | 219/98 |
| 4,579,318 A | 4/1986 | Keedy | |
| 4,778,155 A * | 10/1988 | Suchevich et al. | 266/70 |
| 5,484,973 A | 1/1996 | Gittens et al. | |
| 5,796,070 A * | 8/1998 | Karp | 219/137.43 |
| 7,220,935 B2 | 5/2007 | Ireland et al. | |
| 7,673,786 B2 | 3/2010 | Menotti | |
| 2004/0226655 A1 * | 11/2004 | Kajino et al. | 156/345.11 |
| 2005/0048217 A1 | 3/2005 | Taylor et al. | |
| 2007/0015097 A1 | 1/2007 | Baker | |
| 2007/0029296 A1 | 2/2007 | Boehme | |
| 2007/0145022 A1 * | 6/2007 | Hewett et al. | 219/121.48 |
| 2008/0110866 A1 * | 5/2008 | Chirivella et al. | 219/78.01 |
| 2009/0183488 A1 * | 7/2009 | Namiki et al. | 59/2 |
| 2009/0213599 A1 * | 8/2009 | Hoets et al. | 362/449 |
| 2010/0175528 A1 * | 7/2010 | Rydh | 83/522.14 |
| 2010/0255436 A1 | 10/2010 | Lu | |
| 2010/0270269 A1 * | 10/2010 | Khakhalev et al. | 219/74 |
| 2011/0119873 A1 * | 5/2011 | Manvel | 24/115 R |

FOREIGN PATENT DOCUMENTS

EP 0285349 A2 10/1988
SU 325982 A * 1/1972

* cited by examiner

*Primary Examiner* — Kiley Stoner
(74) *Attorney, Agent, or Firm* — Benesch, Friedlander, Coplan & Aronoff LLP (57) ABSTRACT

A torch shield includes a receptacle having a geometric shape with a central opening. A plurality of chains are disposed on the receptacle, such that the chains hang below the receptacle. A collar is connected to the receptacle for securing the receptacle to a shaft.

20 Claims, 10 Drawing Sheets

Register chain

Ball chain

Link chain

Anchor chain

Sash chain

Double loop coil chain

Twisted link chain

Single jack chain

Round bead chain

Fig. 10

SHIELD FOR A CUTTING OR WELDING TORCH

FIELD OF INVENTION

The present disclosure relates to a shield used in welding and cutting. More particularly, the present disclosure relates to a shield for debris and sparks from a torch.

BACKGROUND

Oxy-fuel torches are used to cut, bend, straighten, and weld materials. "Oxy-fuel" refers to technology that burns oxygen with gaseous fuel. Exemplary gaseous fuels used in oxy-fuel include, without limitation, acetylene, propane, and gasoline. During use, oxy-fuel torches can produce large sparks and debris, including chunks of hot molten metal. Other torches, such as plasma torches can also produce sparks and debris. Existing shields are either solid metal shields or transparent shaded curtains. A solid metal shield may obstruct an operator's view. Additionally, many existing welding curtains do not possess the heat resistance necessary to withstand the high temperature flame produced by oxy-fuel torches.

SUMMARY OF THE INVENTION

A torch shield includes a receptacle having a geometric shape with a central opening. A plurality of chains are disposed on the receptacle, such that the chains hang below the receptacle. A collar is connected to the receptacle for securing the receptacle to a shaft.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
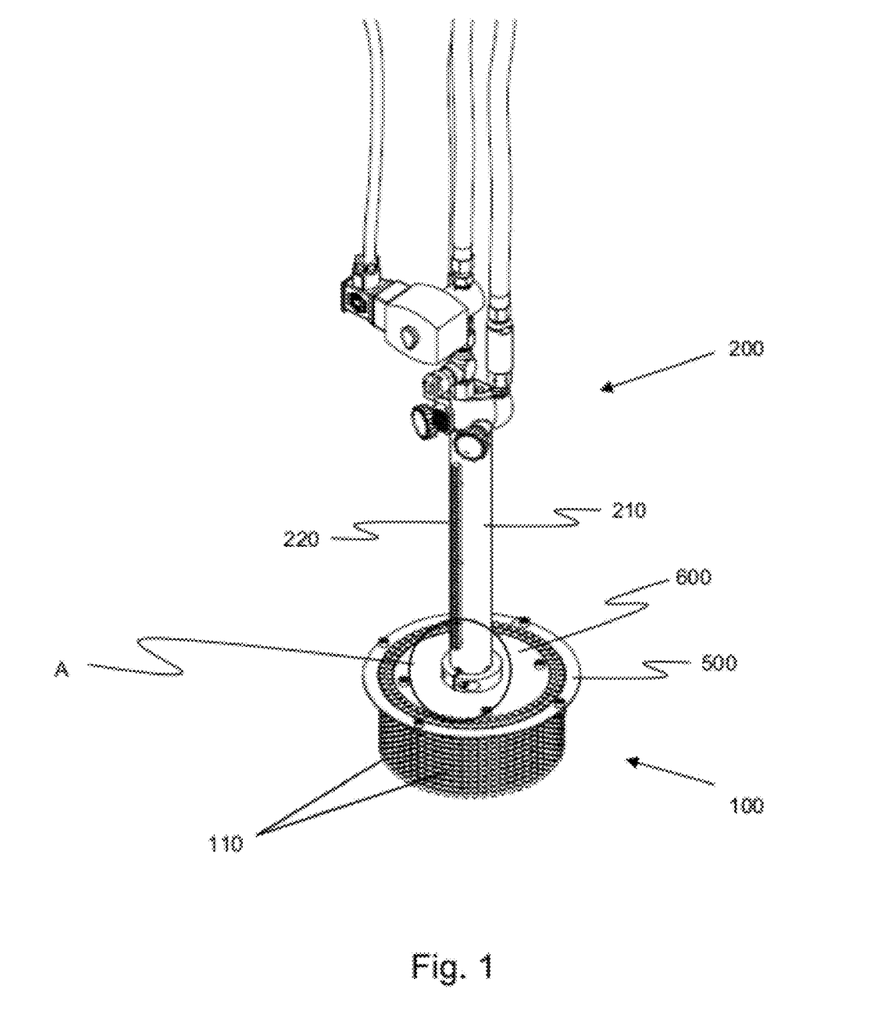
FIG. 1 is a perspective view of one embodiment of a torch shield attached to a torch.
Figure 2:
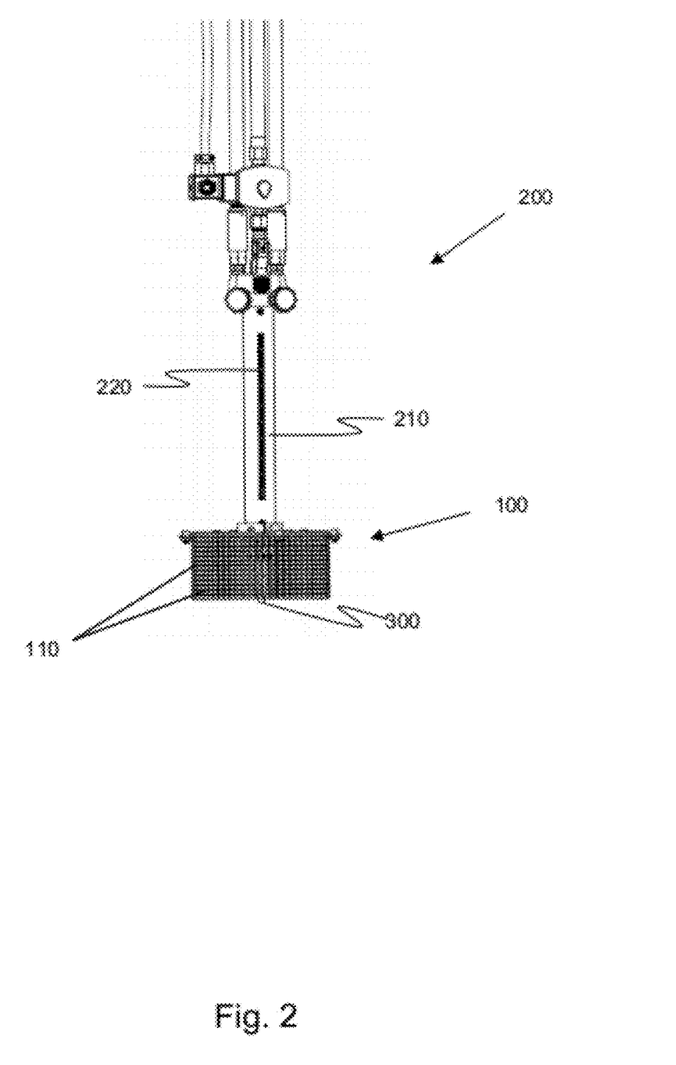
FIG. 2 is a front view of the torch shield attached to the torch.

FIG. 1 is a perspective view of one embodiment of a torch shield 100 attached to a torch 200. The torch shield 100 is attached to a shaft 210 of the torch 200. FIG. 2 is a front view of the torch shield 100 attached to the torch 200. As can be seen from this view, the torch shield 100 is attached to the shaft 210 at a location between a gear rack 220 and a torch tip 300. However, it is to be understood that the torch shield 100 may be attached to the torch 200 at different points along the shaft 210 or at different points along the torch 200.

In the illustrated embodiment the torch 200 is an oxy-fuel torch. In alternative embodiments, other types of torches may be used. In one known embodiment, a plasma torch is employed.

Figure 3:
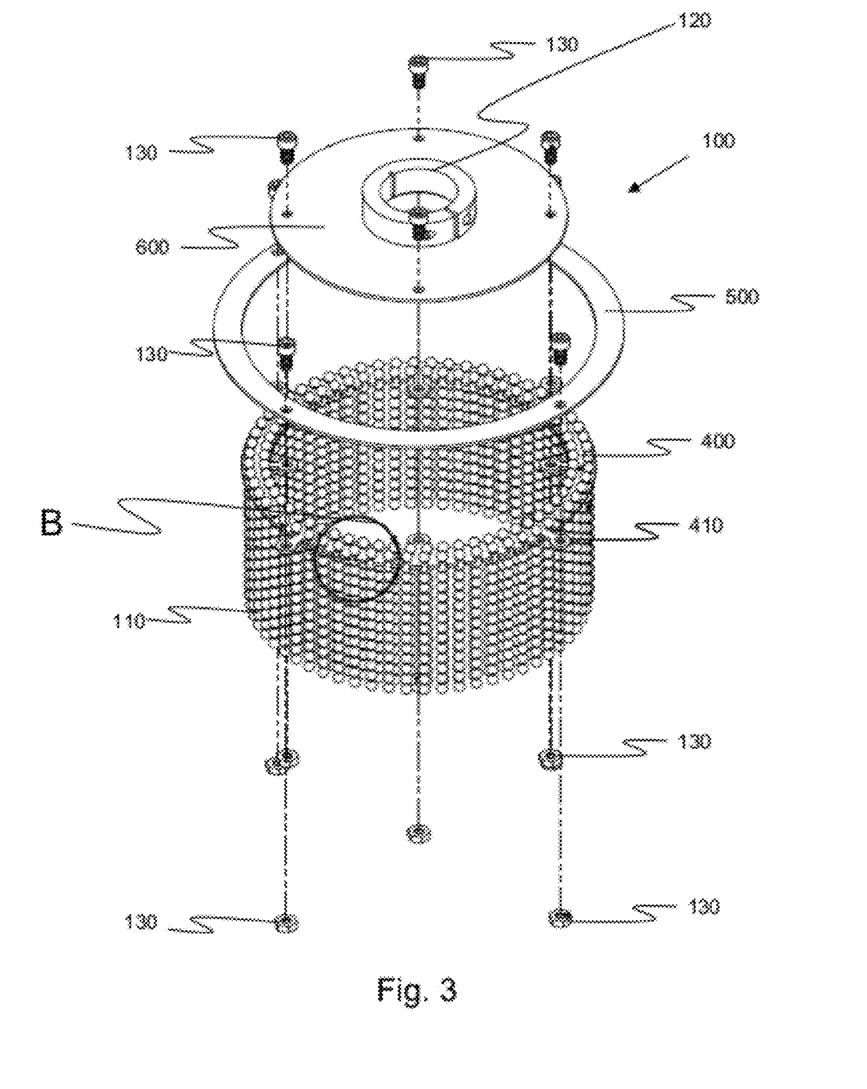
FIG. 3 is an exploded view of the torch shield.

FIG. 3 is an exploded view of one embodiment of the torch shield 100. The torch shield 100 includes a receptacle 400, a plurality of chains 110, a collar 120, an outer plate 500, and an inner plate 600. The chains 110 are attached to the receptacle 400. In the illustrated embodiment, a first end of each chain 110 is attached to the receptacle 400 such that the remainder of the chain 110 hangs below the receptacle. In an alternative embodiment (not shown), a middle portion of each chain may be attached to the receptacle such that two portions of the chain hang below the receptacle. In one such embodiment, a first portion of the chain hangs below an inner side of the receptacle and a second portion of the chain hangs below an outer side of the receptacle. In another embodiment, both portions of the chain are disposed on the same side of the receptacle.

In the illustrated embodiment, the collar 120 is directly attached to the inner plate 600. The inner plate 600 is directly attached to the receptacle 400. The outer plate 500 is also attached to the receptacle 400. In an alternative embodiment (not shown), the collar may be directly attached to the receptacle. In another alternative embodiment (not shown), the collar 120 and the receptacle may form one continuous or semi-continuous molded piece.

Figure 4:
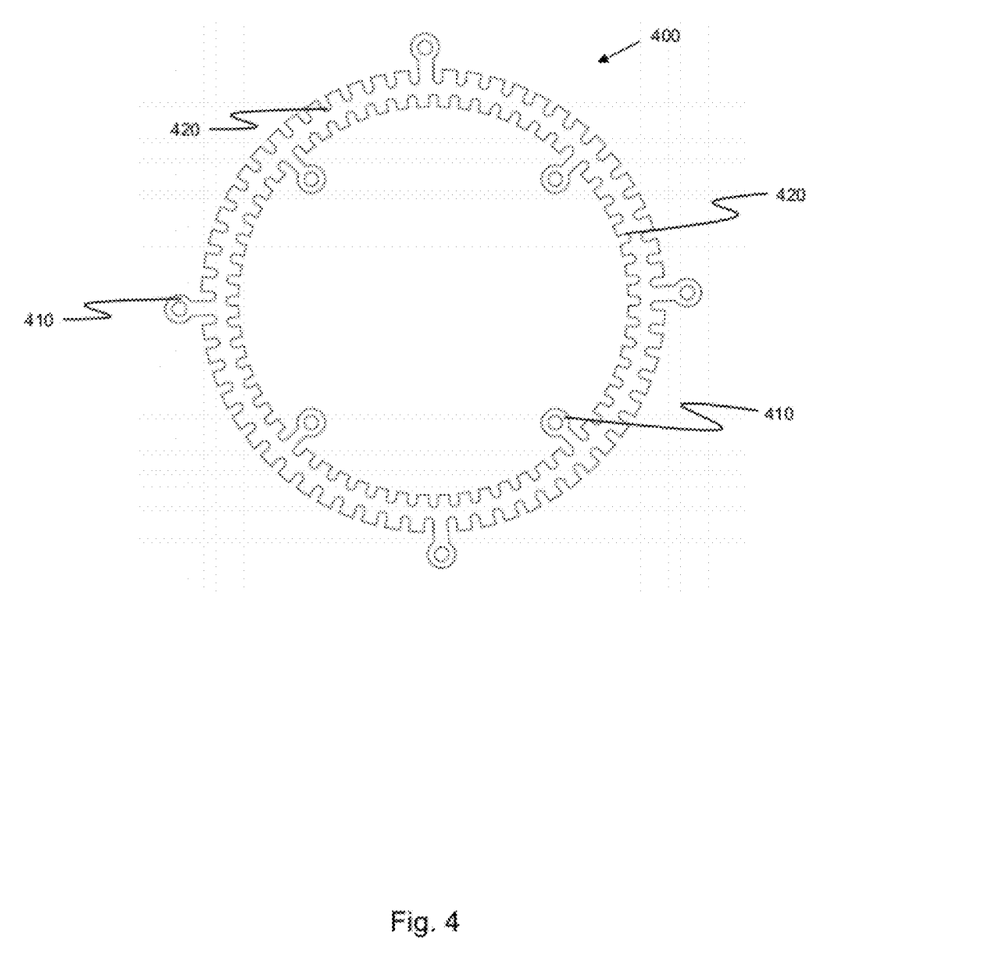
FIG. 4 is a top view of one embodiment of a receptacle of a torch shield.

FIG. 4 is a front view of one embodiment of the receptacle 400. A receptacle 400 may be dimensioned to extend 2 to 7 inches radially from the torch tip 300. In the illustrated embodiment, the receptacle 400 is ring-shaped with an inner diameter and an outer diameter. However, the receptacle may have any geometric shape with a central opening. Non-limiting examples of the shapes for the receptacle include: semi-circle, horseshoe shape, oval, triangle, square, moon shape, or ring shape.

The receptacle 400 includes a plurality of notches 420 along the inner and outer diameters of the receptacle 400. In another embodiment (not shown), the receptacle 400 may have notches 420 along the inner diameter only. In yet another embodiment (not shown), the receptacle 400 may have notches 420 along the outer diameter only. In still another alternative embodiment (not shown), the receptacle may include a series of hooks in place of notches.

The receptacle 400 includes a plurality of eyelets 410 along its inner and outer diameters. In another embodiment (not shown), the receptacle 400 may have eyelets 410 along the inner diameter only. In yet another embodiment (not shown), the receptacle 400 may have eyelets 410 along the outer diameter only.

Figure 5:
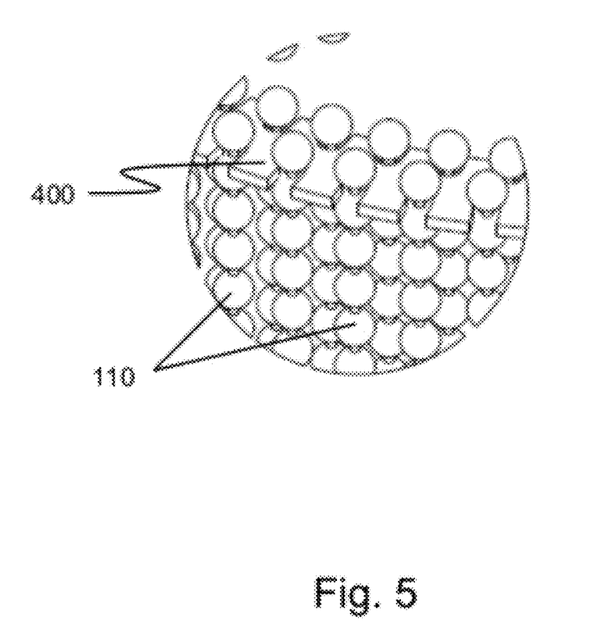
FIG. 5 is a detail view of a portion of the torch shield of FIG. 4.

FIG. 5 is a detail view of FIG. 3 illustrating how the chains 110 may be disposed along the notches 420 of the receptacle 400. However, the chains 110 can be disposed along the notches 420 in any other manner including, but not limited to, hanging, wrapping, dangling, or suspending. In the illustrated embodiment, the chains 110 are aligned in a double ring about the receptacle 400. In an alternative embodiment (not shown), the chains are aligned in a single ring about the receptacle. In yet other embodiment (not shown), three or more strands of chains may be used. In other embodiments a steel mesh may be used. The chains 110 may be double hung along the inner and outer diameter or the chains 110 may be single hung along either the inner or outer diameter.

The chains 110 are disposed in a staggered configuration such that the chains 110 along the inner diameter of the receptacle 400 are placed between neighboring chains 110 along the outer diameter of the receptacle 400. In another embodiment (not shown), the chains 110 may be in a parallel configuration such that the chains 110 along the inner diameter of the receptacle 400 are placed behind and parallel to chains 110 along the outer diameter of the receptacle 400.

Figure 6:
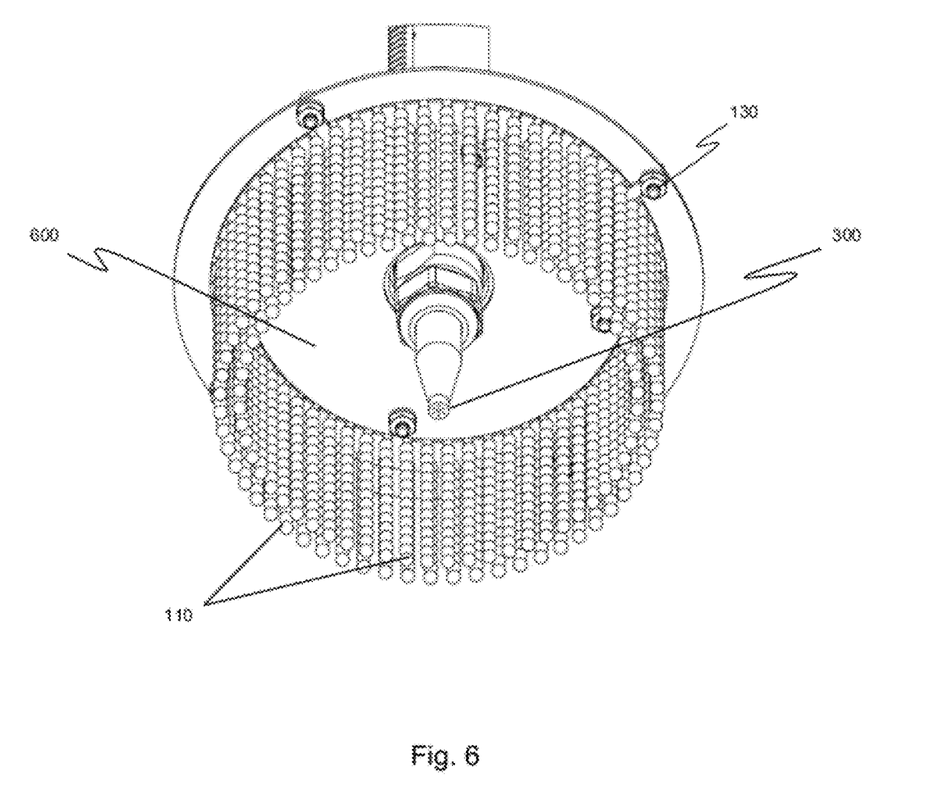
FIG. 6 is a partial bottom perspective view of the torch shield and torch.

FIG. 6 is a partial bottom perspective view of the torch shield 100 and torch 200, which illustrates how the chains 110 may hang below the receptacle 400. In one embodiment, chains 110 may be dimensioned to extend 3 to 7 inches below the torch tip 300.

Figure 7:
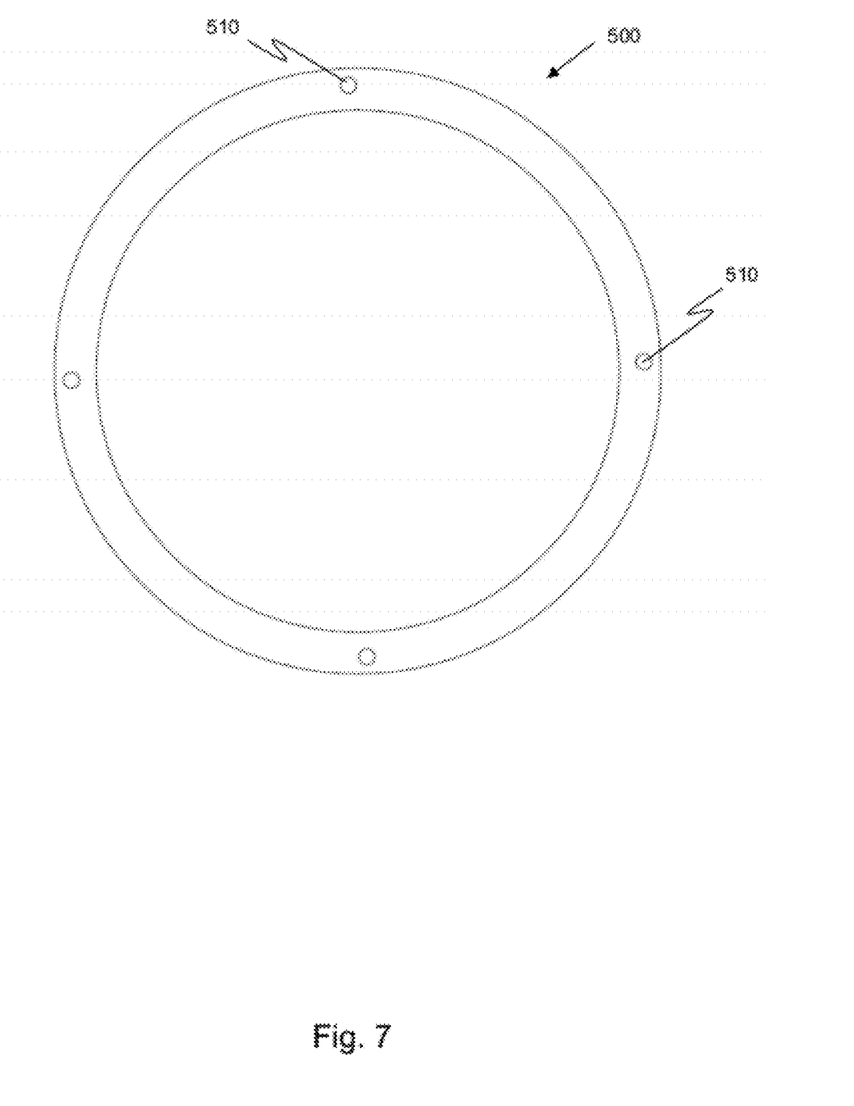
FIG. 7 is a top view of one embodiment of an outer plate of the torch shield.

FIG. 7 is a top view of one embodiment of an outer plate 500. In the illustrated embodiment the outer plate 500 is ring-shaped. The outer plate 500 has a diameter larger than the outer diameter of the receptacle 400. The outer plate 500 includes a plurality of apertures 510 aligned with the eyelets 410 along the outer diameter of the receptacle 400. In one embodiment the outer plate 500 may have an inner diameter of 6.25 inches and an outer diameter of 7.25 inches. The outer plate 500 may be dimensioned to extend 2 to 7 inches radially from the torch tip 300. In alternative embodiments, the outer plate 500 may have any geometric shape with a central opening. Non-limiting examples of the shapes for the outer plate 500 include: semi-circle, horseshoe shape, oval, triangular, square, moon shape, or ring shape.

Figure 8:
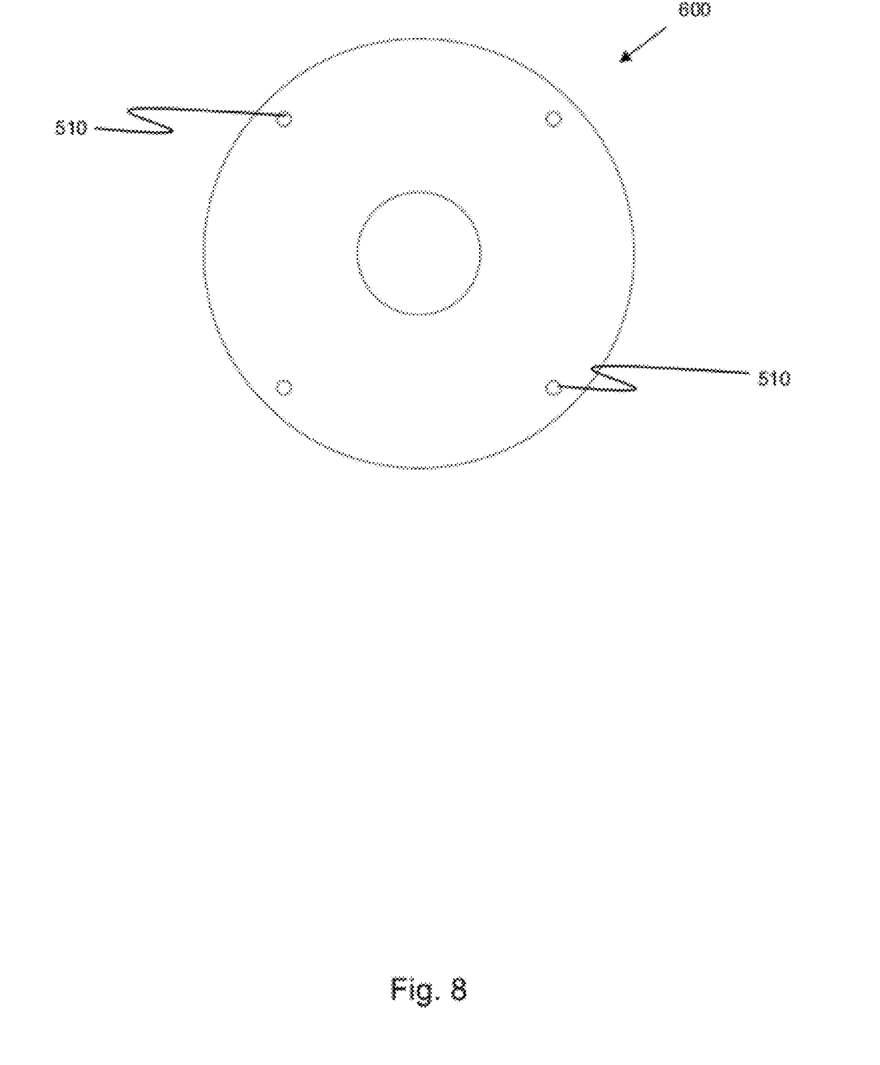
FIG. 8 is a top view of one embodiment of an inner plate of the torch shield.

FIG. 8 is a top view of one embodiment of an inner plate 600. In the illustrated embodiment the inner plate 600 is circular. The inner plate 600 has a diameter smaller than the inner diameter of the receptacle 400. The inner plate 600 includes a plurality of apertures 510 aligned with the eyelets 410 along the inner diameter of the receptacle 400. The inner plate 600 may also include a central opening. In alternative embodiments, the inner plate 600 may have any geometric shape with a central opening. Non-limiting examples of the shapes for the inner plate 600 include: semi-circle, horseshoe shape, oval, triangular, square, moon shape, or ring shape.

The inner and outer plates 600, 500 are connected to the receptacle 400. This connection may occur by placing fasteners 130 through the apertures 510 and the eyelets 410, in the manner illustrated in FIG. 3. In one embodiment, the inner and outer plates 600, 500 are used to secure the chains 110 in place. The inner and outer plates 600, 500 are removably attached to the receptacle 400 to allow the chains 110 to be removed or replaced. The strands of each chain may be individually replaced to allow for greater service life of the torch shield 100. A user may also adjust the length of a chain by inserting a different portion of the chain into a notch. In an alternative embodiment (not shown), the chains may be affixed to the receptacle by welding, soldering, or with the use of an adhesive. In such an embodiment, the inner and outer plates may be omitted. The notches of the receptacle may also be omitted in such an embodiment.

Figure 9:
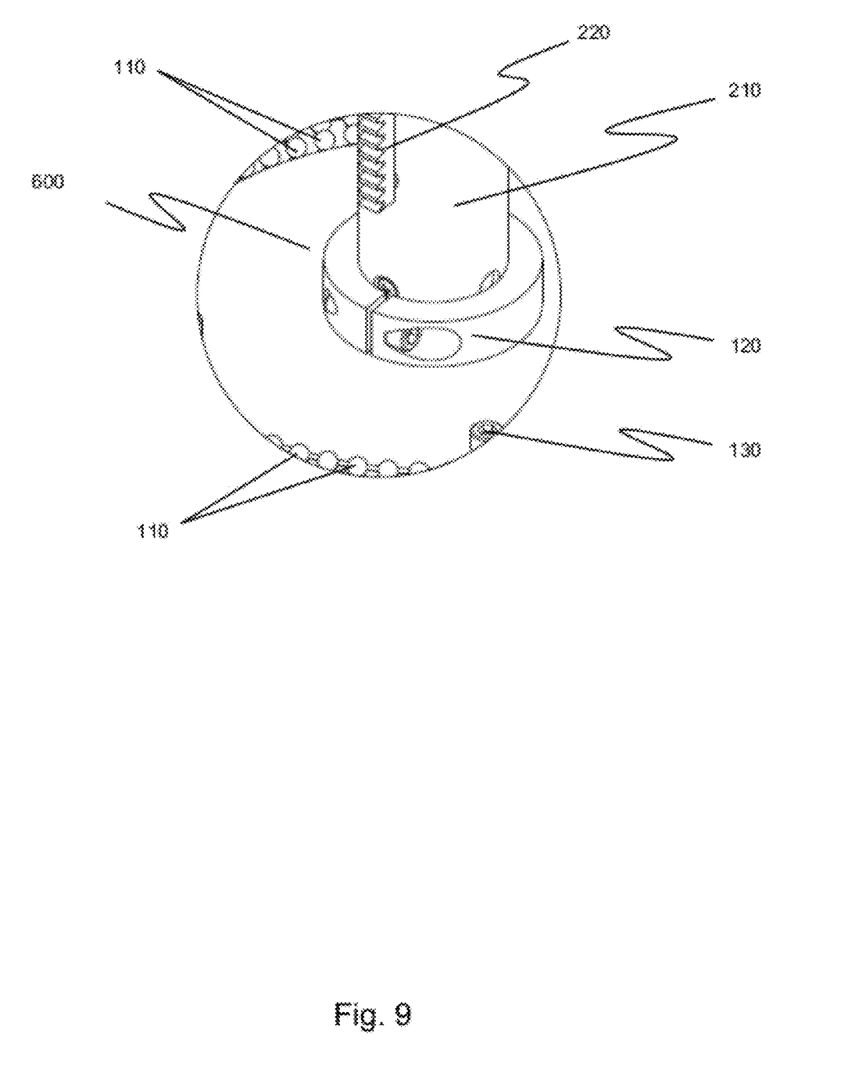
FIG. 9 is a detail view of the torch shield and torch of FIG. 1.

FIG. 9 is a detail view of the torch shield 100 and torch 200 of FIG. 1. In the illustrated embodiment, the collar 120 secures the inner plate 600 and the attached receptacle 400 to the shaft 210. In another embodiment, the collar 120 may be directly attached to the receptacle 400, and the collar 120 is slidably attachable to a shaft 210.

In another embodiment, the collar 120 and the inner plate 600 form one continuous piece. In yet another embodiment, the collar 120, the inner plate 600 and the receptacle 400 form one continuous piece. However, it should be understood that the collar 120 may have any geometric shape with a central opening. In an alternative embodiment (not shown), a collar 120 may be dimensioned to fit an irregular shaped shaft. In yet another alternative embodiment (not shown), a collar 120 may be dimensioned to fit any other part of the torch 200. Non-limiting examples of the shapes for collar 120 include: semi-circle, horseshoe shape, oval, triangular, square, moon shape, or ring shape.

Figure 10:
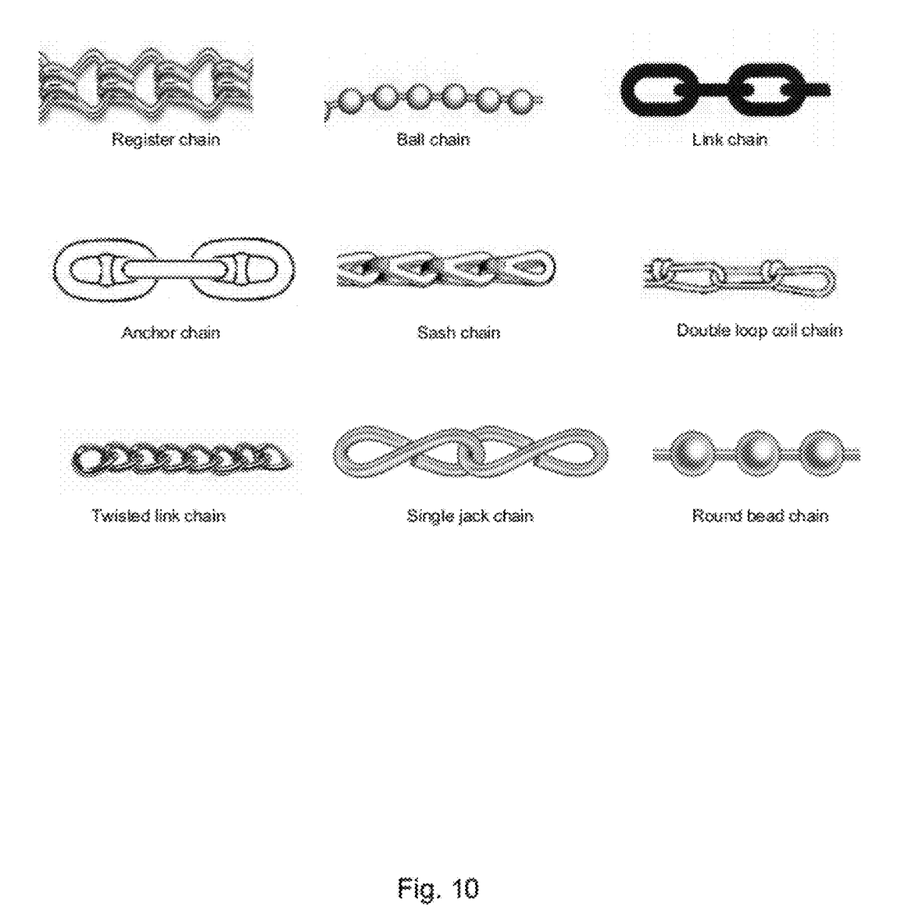
FIG. 10 is a front view of alternative chains of a torch shield.

FIG. 10 is a front view of alternative embodiments of chains for a torch shield. Exemplary chains include a ball chain, a link chain, a straight link chain, an anchor chain, a round bead chain, a register chain, a sash chain, a double loop coin chain, a twisted link chain, a single jack chain, a mesh, or any combination thereof. In another alternative embodiment, metal strips may be employed in place of chains. Such strips may be flexible or rigid. In other alternative embodiments, metal rods, tubes, or dowels may be employed in place of chains. In another alternative embodiment, the shield may be constructed of a combination of two or more of these different elements. It is to be understood that the shielding means may be made of any material capable of withstanding the heat produced by the torch 200.

In the above described embodiments, the receptacle 400, chains 110, collar 120, inner and outer plates 600, 500 and fasteners are constructed of stainless steel. In other embodiments, the receptacle 400, chains 110, collar 120, inner and outer plates 600, 500 and fasteners are constructed of galvanized steel, copper, brass or other metals, or metals with a zinc coating. The receptacle 400, chains 110, collar 120, inner and outer plates 600, 500 and fasteners may each be constructed of the same or a different material.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:
1. A torch shield comprising:
a ring-shaped receptacle with an inner diameter and an outer diameter having:
a plurality of notches along the inner and the outer diameter of the receptacle, a plurality of eyelets along the inner diameter of the receptacle, and a plurality of eyelets along the outer diameter of the receptacle;

a plurality of chains disposed along the notches such that each chain hangs from the receptacle;

a ring-shaped outer plate, having:
  a diameter larger than the outer diameter of the receptacle and
  a plurality of apertures aligned with the eyelets along the outer diameter of the receptacle;

a circular inner plate, having:
  a diameter smaller than the inner diameter of the receptacle,
  a plurality of apertures aligned with the eyelets along the inner diameter of the receptacle, and
  a central opening;

a collar attached to the inner plate, wherein the collar is slidably attachable to a shaft; and a plurality of fasteners attaching the outer and inner plates to the eyelets.

2. The torch shield of claim 1, wherein at least one of the plurality of chains is a ball chain.

3. The torch shield of claim 1, wherein the plurality of chains disposed along the notches are staggered such that the chains along the inner diameter of the receptacle are placed between neighboring chains along the outer diameter of the receptacle.

4. The torch shield of claim 1, wherein the collar and the inner plate form one continuous piece.

5. The torch shield of claim 1, wherein the collar, the inner plate and the receptacle form one continuous piece.

6. The torch shield of claim 1, wherein the shaft is part of a torch.

7. The torch shield of claim 1, wherein the plurality of chains are selected from the group consisting of a ball chain, a link chain, a straight link chain, an anchor chain, a round bead chain, a register chain, a sash chain, a double loop coin chain, a twisted link chain, and a single jack chain.

8. A torch shield comprising:
  a receptacle having a geometric shape with a central opening and a plurality of notches disposed along the central opening;
  a plurality of chains received in the notches of the receptacle, such that the chains hang below the receptacle;
  an inner plate having a shape corresponding to the central opening, wherein the inner plate is adjacent to the receptacle and retains the chains in the notches; and
  a collar connected to the receptacle for securing the receptacle to a shaft.

9. The torch shield of claim 8, wherein the chains are balls chains.

10. The torch shield of claim 8, wherein the chains are link chains.

11. The torch shield of claim 8, wherein the collar and the receptacle form one continuous piece.

12. The torch shield of claim 8, wherein the receptacle has a general configuration of a ring.

13. The torch shield of claim 8, wherein the plurality of chains are selected from the group consisting of a ball chain, a link chain, a straight link chain, an anchor chain, a round bead chain, a register chain, a sash chain, a double loop coin chain, a twisted link chain, and a single jack chain.

14. The torch shield of claim 8, wherein the plurality of chains are aligned in a single ring about the receptacle.

15. The torch shield of claim 8, wherein the plurality of chains are aligned in a double ring about the receptacle.

16. A torch shield comprising:
  a means for shielding sparks and debris produced from a torch;
  a receptacle having a plurality of notches disposed along an outer edge of the receptacle;
  an outer plate adjacent to the outer edge of the receptacle, wherein the outer plate is configured to retain the means for shielding in the notches; and
  a collar connected to the receptacle.

17. The torch shield of claim 16, wherein the collar and the receptacle form one continuous piece.

18. The torch shield of claim 16, wherein the outer plate is attached to the receptacle.

19. The torch shield of claim 16, further comprising an inner plate attached to the receptacle.

20. The torch shield of claim 19, wherein the collar is attached to the inner plate.

* * * * *